United States Patent [19]
Lortz et al.

[11] Patent Number: 4,911,377
[45] Date of Patent: Mar. 27, 1990

[54] ANTI-CINCH AUTOMATIC LOCKING RETRACTOR

[75] Inventors: Allan R. Lortz, Carmel; Ronald F. Homeier, Plainfield; Jeffrey E. Peterson, Noblesville, all of Ind.

[73] Assignee: Indiana Mills & Manufacturing, Inc., Westfield, Ind.

[21] Appl. No.: 367,427

[22] Filed: Jun. 16, 1989

[51] Int. Cl.⁴ ............................................. B60R 22/34
[52] U.S. Cl. .............................................. 242/107.4 D
[58] Field of Search ................. 242/107.4 D, 107.4 A, 242/107.4 B, 107.4 C, 107.4 E, 107.4 R, 107.2

[56]      References Cited
   U.S. PATENT DOCUMENTS 3,945,586  3/1976  Higbee et al. ................ 242/107.4 D
4,611,770  9/1986  Cotter ........................... 242/107.4 D

FOREIGN PATENT DOCUMENTS 3022756  3/1982  Fed. Rep. of Germany ... 242/107.4 D

*Primary Examiner*—John M. Jillions
*Attorney, Agent, or Firm*—Woodard, Emhardt, Naughton Moriarty & McNett

[57]           ABSTRACT

An automatic locking retractor for a vehicle seat belt has a pawl which is held for limited pivoting movement within a floating pawl retention cradle. The cradle is mounted within the frame of the retractor for limited sliding movement within a pair of aligned arcuate slots, the pawl and cradle combination sliding within the slots to permit limited retraction of the seat belt when the pawl is lockingly engaged.

5 Claims, 1 Drawing Sheet

ANTI-CINCH AUTOMATIC LOCKING RETRACTOR

FIELD OF THE INVENTION

The present invention relates to automatic locking retractors for vehicle seat belts and more particularly to anti-cinch devices providing for limited movement of the wearer without further locking retraction of the belt.

BACKGROUND OF THE INVENTION

One widely used type of seat belt device is the automatic locking retractor wherein once the desired length of seat belt webbing has been pulled or protracted from the retractor, a slight retraction or release in tension engages an internal locking mechanism which prevents further protraction of the belt. To release additional seat belt webbing, the belt must be nearly fully retracted and then pulled out or protracted again. While reliably ensuring a secure hold on the wearer, the typical automatic locking retractor has an undesirable drawback-clinching. As the wearer adjusts in his or her cushioned seat or the vehicle encounters rough terrain, the belt may be allowed to retract slightly. The typical automatic locking retractor operates via a ratchet and pawl mechanism. Usually the slight retraction of the belt due to the wearer's movements is enough to permit the ratchet to advance one or several teeth thus locking the belt slightly tighter around the wearer. The result of several or even one such unplanned tightenings is an uncomfortable if not dangerous seat belt positioning.

In U.S. Pat. No. 4,611,770 issued to Cotter, a motor vehicle automatic seat belt retractor is provided with a rotatable saddle which carries the locking pawl. While the pawl is lockingly engaged with the corresponding ratchet members, tension on the belt will cause the saddle and pawl to rotate slightly with the ratchet member.

SUMMARY OF THE INVENTION

Generally speaking, there is provided an automatic locking retractor for a vehicle seat belt adapted with an anti-cinch device for preventing undesired retraction of the seat belt due to slight body movements of the wearer.

An automatic locking retractor for a vehicle seat belt includes a frame with a pair of upstanding sides, the sides defining a pair of aligned holes defining n axis and a pair of arcuate slots having upper and lower extremes; a spool mounted within the holes for rotation about the axis, the spool having a pair of spaced-apart ratchet wheels and adapted to retract and protract seat belt webbing; a spring member for urging rotation of the spool to retract the webbing; a cradle mounted to slide within the slots; a pawl pivotally mounted to the cradle and adapted for engagement with the ratchet wheels, and wherein the slots, cradle and pawl and ratchet wheels are relatively sized and positioned to permit the pawl to be pivoted relative to the cradle between an engaged position wherein the pawl locks with the ratchet wheels to prevent protraction of the webbing and a disengaged position wherein the pawl is disengaged from the ratchet wheels sufficiently to permit retraction; pawl spring means mechanically mounted between the cradle and the pawl for urging the pawl into engagement; cradle spring means mechanically mounted for urging the cradle toward the upper extremes of the slots; a friction clutch plate mounted to rotate about the spool outside of and adjacent to one of the ratchet wheels, the clutch defining first node means for disengaging the pawl during protraction and second node means for pivoting the pawl away from the ratchet plates during retraction; and initial disengaging means for disengaging the pawl during initial protraction of the webbing.

When the pawl is lockingly engaged with the ratchet wheels of the retractor mechanism, the cradle and slots cooperate to provide limited protraction of the seat belt webbing.

It is an object of the present invention to provide an improved automatic locking retractor.

It is another object of the present invention to provide an automatic locking retractor which provides a limited amount of protraction when the pawl is lockingly engaged.

Further objects and advantages will become apparent from the following description of the preferred embodiment.

DESCRIPTION OF THE PREFERRED EMBODIMENT

Figure 1:
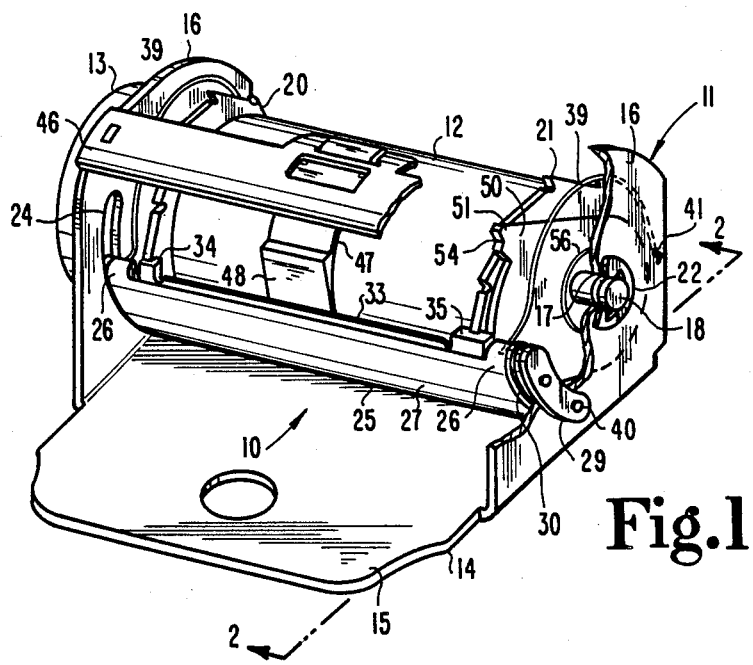
FIG. 1 is a perspective view of an automatic locking retractor in accordance with the preferred embodiment of the present invention and with portions broken away for clarity.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
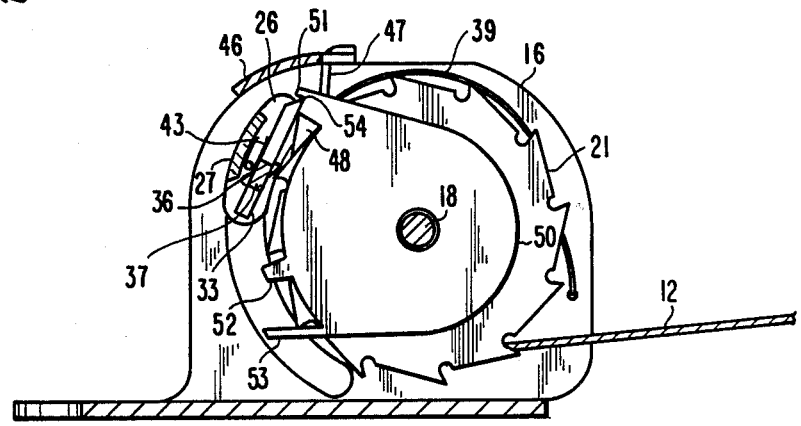
FIG. 2 is a cross-sectional view of the retractor of FIG. 1 taken along the lines 2—2 and viewed in the direction of the arrows and showing cradle 25 in the upper extreme position within slots 24.

Referring now to the drawings and in a particular to FIG. 1, there is shown an anti-cinch device 10 for an automatic locking retractor 11 in accordance with the preferred embodiment of the present invention. Automatic locking retractor 11 typically includes a U-shaped frame 14 having a base 15 and a pair of opposing, upstanding sides 16. Sides 16 define a pair of opposed and aligned holes 17 for rotatably receiving therein webbing take-up spool 18. Spool 18 includes a pair of spaced-apart ratchet wheels 20 and 21 and is held for rotation within holes 17 by appropriate means such as locking rings 22. A coil spring mechanism 13 urges spool 18 to rotate clockwise as shown in FIGS. 1 and 2, which rotation would retract seat belt webbing 12. The remainder of automatic locking retractor 11 will now be described as adapted to operate with anti-cinch device 10.

Figure 3:
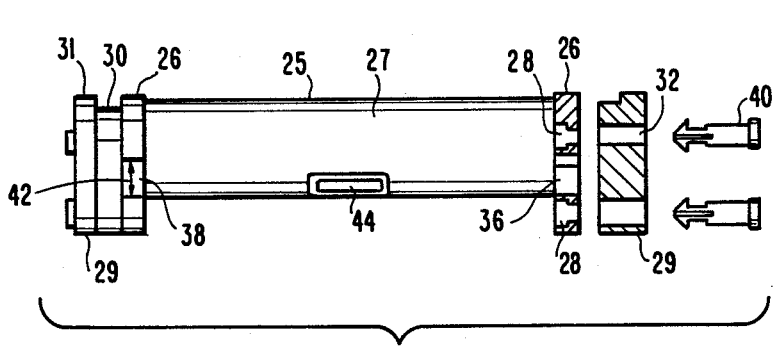
FIG. 3 is a partially cross-sectioned, rear elevational view of the cradle, caps and bayonet pins, the cross-section taken along the lines 3—3 of the cradle shown in FIG. 4 and viewed in the direction of the arrows.
Figure 4:
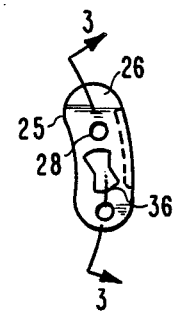
FIG. 4 is a side elevational view of just the cradle of the retractor of FIG. 1.

Sides 16 further define a pair of aligned, arcuate slots 24. A floating pawl retention cradle 25 has a generally kidney-bean cross-section at its outer end portions 26 with an elongate, slightly arcuate cross-section portion 27 therebetween. As shown in FIGS. 3 and 4, each end portion 26 defines a pair of anchor holes 28 and a shaped aperture 36. Each anchor hole 28 has a large diameter and a small diameter portion. A pair of end caps 29 each also have a generally kidney-bean cross-section. A portion 30 of each cap 29 has a reduced cross-section complementary to that of blots 24 while the remainder 31 of each cap 29 has a cross-section larger than that of slots 24 (FIGS. 1 and 3). Each cap 29 has a pair of holes 32 which will align with anchor holes 28. Cradle 25 is slidably mounted to fame 14 by positioning cradle 25 between sides 16 and in alignment with slots 24. Each cap 29 is then maneuvered so that reduced cross-section portion 30 passes through the corresponding slot 24 in alignment with cradle 25. Appropriate fastening means such as bayonet pins 40 are then forced through holes 32 and 28 and locked in place, holding each cap 29 firmly at one end of cradle 25. Cradle 25 and caps 29 may now move only in the arcuate path defined by slots 24 between upper and lower extremes defined by the length of slots 24. Cradle 25 is urged to the upper extreme within slots 24 (as shown in FIG. 2) by a pair of springs 39. Springs 39 are anchored at one end in a conventional fashion to outer ends 26 and extend parallel to corresponding sides 16, around spool 18 and are anchored within respective holes 41 at the back of sides 16.

A pawl 33 defines a pair of ratchet wheel engagement teeth 34 and 35, which are spaced to engage the two ratchet wheels 20 and 21, respectively, when pawl 33 is mounted to cradle 25 between end portions 26. Extending outwardly from each end of pawl 33 is a rectangular cross-sectioned pivot post 37 (FIG. 2). Pawl 33 is mounted to cradle 25 for limited pivoting movement with posts 37 extending outwardly into respective shaped apertures 36 and 38. In one prototype, one of the apertures 36 is closed and the other aperture 38 opens rearwardly (upwardly from the page in FIG. 3). The vertical height 42 of aperture 38 is slightly less than the length of the long side of rectangular cross-sectioned pivot post 37. Paul 33 is mounted to cradle 25 by first inserting one pivot post 37 into aperture 36, then sliding the other pivot post 37 into rearwardly opening aperture 38. Not only is pawl 33 thus permitted to pivot through approximately 22° about an axis generally defined through the two posts 37, but pawl 33 also moves as unit with cradle 25 as cradle 25 slides within arcuate slots 24. A pawl spring 43 is mounted to spring mount 44 of cradle 25 (FIGS. 2 and 3) in a conventional manner. In the preferred embodiment, one end of spring 43 is mounted within an aperture defined by spring mount 44. The other end of spring 43 rests against pawl 33 (as shown in FIG. 2) to urge pawl 33 and teeth 34 and 35 to pivot into engagement with ratchet wheels 20 and 21. Engagement of pawl 33 with ratchet wheels 20 and 21 acts to preclude rotation of spool 18 and thus protraction of webbing 12.

A tie bar 46 is mounted across the top of frame sides 16. A plastic webbing follower 47 is hingedly suspended from tie bar 66 and extends partially around the webbing 12, the latter being wound around spool 18. Follower 47 has a cammed portion 48, the operation of which is described herein.

A friction clutch plate 50 is mounted to rotate about spool 18 outside of and adjacent to ratchet wheel 21. A helical spring 56 is interposed between friction plate 50 and the corresponding side 16 to urge plate 50 against ratchet wheel 21. Friction clutch plate 50 defines first, second and third generally radially extending nodes 51, 52 and 53, respectively. First node 51 defines an L-shaped shoulder portion 54. Ratchet wheel engagement tooth 35 is wide enough to simultaneously engage both a toot of ratchet wheel 21 and first node 51.

With reference to the above description, operation of automatic locking retractor 11 with anti-cinch device 10 will now be described:

In the initial, completely retracted condition, cradle 25 is in the upper extreme position (as shown in FIG. 2) and webbing 12 is sufficiently wound around spool 18 so that cammed portion 48 of follower 47 is pushed outwardly against pawl 33, disengaging pawl 33 from ratchet wheels 20 and 21. Pulling webbing 12 from retractor 11 (protraction) causes spool 18 and ratchet wheels 21 t rotate counterclockwise (as viewed in FIG. 2), the latter rotation urging friction clutch plate 50 to rotate counterclockwise. Cammed surface 48 initially, and for a portion of the initial protraction, holds pawl 33 pivoted away from ratchet wheels 20 and 21 so that during the initial protraction, when friction clutch plate 50 is rotated counterclockwise, first node 51 will engage pawl 33 (as shown in FIG. 2). L-shaped shoulder portion 54 acts both as a stop to prevent further counterclockwise rotation of plate 50 and as a stop to prevent pawl 33 from engaging the ratchet wheels. As webbing 12 is further protracted, webbing follower 47, and thus cammed portion 48, fall away from pawl 33. Now, only first node 51 holds pawl 33 out of engagement with the ratchet wheels, thus still allowing further protraction.

As soon as protraction of belt webbing 12 is stopped and webbing 12 is allowed to retract just slightly, spool 18, ratchet wheel 21 and thus friction plate 50 rotate slightly clockwise, causing first one 51 to disengage from pawl 33. Pawl 33 then rotates into engagement with ratchet wheels 20 and 21 due to pawl spring 43. In the standard automatic locking retractor, the only amount of "play" with the extended webbing 12 is afforded by the arcuate distance between ratchet teeth on wheels 20 and 21. Additional play is provided by the present invention in that further pulling of webbing 12 urges spool 18 and ratchet wheels 20 and 21 to rotate counterclockwise which urges pawl 33 and cradle 25 to slide downward within slots 24 to the lower extreme (shown in FIG. 1) against the bias of cradle springs 39. If sufficient pulling force is applied, webbing 12 may be pulled out an additional distance (approximately one-half inch in one model) corresponding to the length of slots 24. Release of tension on the extended webbing 12 will first allow cradle 25 and pawl 33 to return to the upper extreme within slots 24 nd will next allow clockwise rotation of spool 18 and retraction of webbing 12. As spool 18 and ratchet wheel 21 rotate, clutch plate 50 will rotate clockwise until third node 53 contacts the bottom of pawl 33. Second node 52, having a smaller radial length than third node 53 passed beyond the bottom of pawl 33, is now positioned above pivot post 37 and has pivoted pawl 33 away from ratchet wheels 20 and 21, thus now precluding the standard ratchet and pawl clicking sound as webbing 12 is retracted.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An automatic locking retractor for a vehicle seat belt, comprising:

a frame having a pair of upstanding sides, the sides defining a pair of aligned holes defining an axis and a pair of arcuate slots having upper and lower extremes;

a spool mounted within said holes for rotation about said axis, said spool having at least one ratchet wheel and adapted to retract and protract seat belt webbing;

spool spring means mounted to said frame for urging rotation of said spool to retract said webbing;

a cradle mounted to slide within said slots;

a pawl pivotally mounted to said cradle and adapted for engagement with said at least one ratchet wheel, and wherein said slots, cradle, pawl an ratchet wheel are relatively sized and positioned to permit said pawl to be pivoted relative to said cradle between an engaged position wherein said pawl locks with said at least one ratchet wheel to prevent protraction-type rotation of said spool and a disengaged position wherein said pawl is disengaged from said at least one ratchet wheel sufficiently to permit protraction;

pawl spring means mechanically mounted between said cradle and said pawl for urging said pawl into engagement;

cradle spring means mechanically mounted for urging said cradle toward the upper extremes of said slots;

a friction clutch plate mounted to rotate about said spool outside of and adjacent to said at least one ratchet wheel, said clutch defining first node means for disengaging said pawl during protraction and second node means for pivoting said pawl away from said at least one ratchet wheel during retraction; and initial disengaging means for disengaging said pawl during initial protraction of said webbing.

2. The automatic locking retractor of claim 1 wherein said at least one ratchet wheel is a pair of spaced-apart ratchet wheels adapted to receive seat belt webbing therebetween.

3. An anti-cinch automatic locking retractor, comprising:

frame means for mounting of the retractor;

spool means rotatably mounted about an axis to said frame means and for having a web wound thereon;

a ratchet fixedly mounted on said spool means for rotation therewith;

pawl means movably mounted on said frame means and releasably lockable with said ratchet operable to limit rotation of said spool and protraction of said web;

clutch means movably mounted on said frame means and drivenly engaged by said spool means being operable to move into and out of engagement with said pawl means to control engagement of said pawl means with respect to said ratchet; and, carrier means movably mounted on said frame means at a location remote from said spool means and said axis, said carrier means having said pawl means movably mounted thereon and operable to move with said pawl means when said pawl means is locked to said ratchet and said spool means is rotated for movement of said web.

4. The anti-cinch automatic locking retractor of claim 3 wherein said frame means includes a pair of upstanding sides which define a pair of arcuate slots and wherein said carrier means includes a cradle mounted to slide within said slots.

5. The anti-cinch automatic locking retractor of claim 4 wherein said pawl means includes a pawl pivotally mounted to said cradle and wherein said slots, cradle, pawl and ratchet are relatively sized and positioned to permit said pawl to be pivoted relative to said cradle between an engaged position wherein said pawl locks with said ratchet to prevent protraction of said webbing and a disengaged position wherein said pawl is disengaged from said ratchet sufficiently to permit protraction.

* * * * *

UNITED STATES PATENT AND TRADEMARK OFFICE
CERTIFICATE OF CORRECTION

PATENT NO. : 4,911,377

DATED : March 27, 1990

INVENTOR(S) : Allan R. Lortz et al.

It is certified that error appears in the above-identified patent and that said Letters Patent is hereby corrected as shown below:

In column 1, line 23, please change "clinching" to --cinching--.
In column 1, line 49, please change "n" to --an--.
In column 2, line 54, please delete "a".
In column 3, line 13, please change "blots" to --slots--.
In column 3, line 17, please change "fame" to --frame--.
In column 3, line 67, please change "66" to --46--.
In column 4, line 12, please change "toot" to --tooth--.
In column 4, line 23, please change "t" to --to--.
In column 4, line 42, please change "one" to --node--.
In column 4, line 59, please change "nd" to --and--.
In column 5, line 26, please change "an" to --and--.

Signed and Sealed this

Second Day of April, 1991

Attest:

HARRY F. MANBECK, JR.

Attesting Officer

Commissioner of Patents and Trademarks